(12) United States Patent
Goodman et al.

(10) Patent No.: US 8,251,701 B2
(45) Date of Patent: Aug. 28, 2012

(54) INTERACTIVE LANGUAGE APPARATUS

(75) Inventors: Jason Goodman, Montreal (CA); David Reynolds, Toronto (CA); Mary Plasterer, Toronto (CA); Sarah Townshend, Mississauga (CA)

(73) Assignee: Cieo Creative Inc., Toronto, ON (CA)

( * ) Notice: Subject to any disclaimer, the term of this patent is extended or adjusted under 35 U.S.C. 154(b) by 1019 days.

(21) Appl. No.: 11/872,808

(22) Filed: Oct. 16, 2007

(65) Prior Publication Data

US 2009/0098517 A1 Apr. 16, 2009

(51) Int. Cl.
*G09B 1/36* (2006.01)
(52) U.S. Cl. ........ 434/171; 434/156; 434/161; 434/176; 434/308
(58) Field of Classification Search .................. 434/128, 434/156, 169, 171, 176, 308, 161
See application file for complete search history.

(56) References Cited

U.S. PATENT DOCUMENTS

| | | | | |
|---|---|---|---|---|
| 3,659,356 A | * | 5/1972 | Nelson | 434/169 |
| 3,903,617 A | * | 9/1975 | Evans | 434/171 |
| 5,111,409 A | * | 5/1992 | Gasper et al. | 715/203 |
| 5,511,980 A | * | 4/1996 | Wood | 434/169 |
| 5,799,267 A | * | 8/1998 | Siegel | 704/1 |
| 5,823,782 A | * | 10/1998 | Marcus et al. | 434/156 |
| 6,442,523 B1 | * | 8/2002 | Siegel | 704/270 |
| 6,517,351 B2 | * | 2/2003 | Spector | 434/169 |
| 6,830,452 B2 | * | 12/2004 | Spector | 434/169 |
| 7,040,898 B2 | * | 5/2006 | Marcus et al. | 174/504 |
| 7,182,601 B2 | | 2/2007 | Donnan | |
| 2003/0118973 A1 | * | 6/2003 | Noble | 434/167 |
| 2005/0053900 A1 | * | 3/2005 | Kaufmann | 434/169 |
| 2005/0227209 A1 | | 10/2005 | Von Ridder et al. | |
| 2009/0082951 A1 | * | 3/2009 | Graessley | 701/200 |

OTHER PUBLICATIONS

<www.eblocks.net/n/index.php, Apr. 30, 2007> [online] [retrieved on Apr. 30, 2007].

* cited by examiner

*Primary Examiner* — Kang Hu
(74) *Attorney, Agent, or Firm* — Marks & Clerk

(57) ABSTRACT

An interactive educational apparatus, ideally suitable for children. A set of symbol pieces, preferably in the form of letter blocks are provided. An interface board is provided for accommodating one or more selected symbol pieces and a sensor on said interface board generates a signal identifying each symbol piece when placed on the interface board. Media files are stored on a storage medium and each media file has an associated tag. A processor is programmed to match a search key represented by one or more selected symbol pieces with the tags. A display device displays one or more media files having identifier tags matching the search key represented by said selected symbol pieces. These identifier tags provide a way to match up the media files with each search key generated by placement of the symbol pieces on the interface board.

19 Claims, 4 Drawing Sheets

INTERACTIVE LANGUAGE APPARATUS

FIELD OF THE INVENTION

The present invention relates to children's entertainment, education and development. More specifically, the present invention relates to an interactive language apparatus useful in helping children explore letters and words.

BACKGROUND OF THE INVENTION

Language skills of children begin when they are very young. A number of studies reinforce the notion that it is crucial to begin allowing children to explore language in the early years. It is also beneficial to create in a child interest and excitement in exploring language.

There are a great many tools for teaching young children language and/or arithmetic skills, such as various types of board games etc. However, technology is rapidly growing and becoming part of everyone's everyday world, including young children. Combining educational language skills tools with technological advances such as computers is a natural evolution. Computerized versions of various language tools are also known in the art but many of them are contrived, artificial environments where neither the parents nor the child is an active participant in customizing the tool.

Electronic learning games and toys are known. However, many of these are highly inflexible and restrictive in their use.

SUMMARY OF THE INVENTION

Disclosed is interactive language apparatus for teaching children to explore letters and words.

Thus, according to one aspect, the invention provides an interactive language apparatus, comprising a set of symbol pieces, an interface board for accommodating one or more selected symbol pieces, a sensor on said interface board for generating a signal identifying each symbol piece when placed on said interface board, a storage medium containing media files having associated tags, a processor programmed to match a search key represented by one or more selected symbol pieces with said tags, and a display device for displaying one or more media files having identifier tags matching said search key represented by said selected symbol pieces. Preferably, the symbol pieces are letters for spelling words, and preferably the letters are English language letters.

Each symbol piece may have a unique electronic signature used by the sensor for identifying each symbol piece when placed on said interface board. Preferably the interface board includes receptacles for accommodating each symbol piece and each receptacle includes a sensor. For forming the search key, the leftmost occupied receptacle accommodating a symbol piece preferably is considered to be the first symbol in the search key and any empty receptacle to the right of the leftmost receptacle is considered to be a wildcard in the search key. During the search process, said media files having identifier tags matching said search key could be zoomed and scaled to an appropriate size for display on said display screen.

In one embodiment, the display includes a virtual rendering to the interface board.

In one embodiment, the storage medium is on an external server and the media files are launched from the storage medium to the display device via the Internet. The display device may be part of a personal computer, and the personal computer may include interface software thereon to allow the interface device to communicate with the external server.

In one embodiment, the media files are provided by a user and may include digital photos, digital videos, animations, sound effects and/or music. In another embodiment, the media files could be pre-made, original or licensed content.

There are many advantages in using an interactive educational apparatus in accordance with the teachings of this invention. By permitting the user (parent) to be an active participant by providing their own media files, the media files are familiar to the child. This may promote interest in the child, which in turn may result in increased learning.

The media files can be of various forms, including video, photographs, sounds, etc. This creates a very dynamic environment for the child, again promoting interest in using the apparatus.

When the storage medium is on an external server, the number and size of the media files that can be used increases, allowing the users to have access to a high number of possibilities in customizing the apparatus.

In another aspect, the invention provides an interface board for use in an interactive language apparatus, said interface board being configured for accommodating one or more selected symbol pieces, the board comprising a sensor for generating a signal identifying each symbol piece when placed on said interface board, connection to a storage medium containing media files having associated tags, connection to a processor programmed to match a search key represented by one or more selected symbol pieces with said tags, and connection to a display device for displaying one or more media files having identifier tags matching said search key represented by said selected symbol pieces.

In another aspect, the invention provides a method of using an interactive language apparatus, comprising storing media files having associated tags on a storage medium, placing one or more selected symbol pieces an interface board, generating a signal identifying each symbol piece when placed on said interface board, matching a search key represented by one or more selected symbol pieces with said tags, and displaying one or more media files having identifier tags matching said search key represented by said selected symbol pieces.

Embodiments of the invention are useful in helping children get excited about language by creating an interactive language apparatus in which children feel like they are actually building words.

Other aspects and advantages of embodiments of the invention will be readily apparent to those ordinarily skilled in the art upon a review of the following description.

BRIEF DESCRIPTION OF THE DRAWINGS

Embodiments of the invention will now be described in conjunction with the accompanying drawings, wherein.

This invention will now be described in detail with respect to certain specific representative embodiments thereof, the materials, apparatus and process steps being understood as examples that are intended to be illustrative only. In particular, the invention is not intended to be limited to the methods, materials, conditions, process parameters, apparatus and the like specifically recited herein.

DETAILED DESCRIPTION OF THE DISCLOSED EMBODIMENTS

Figure 1:
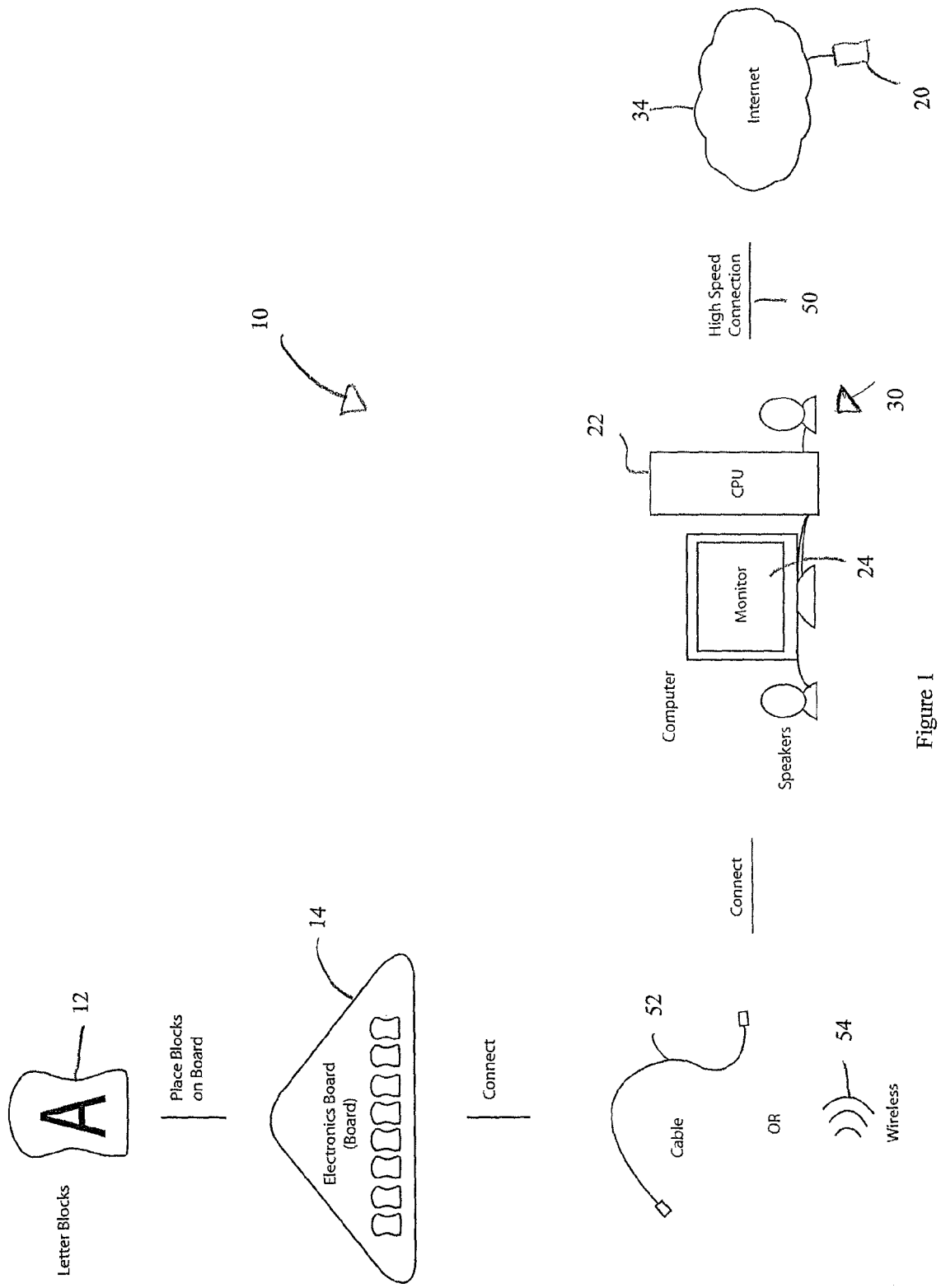
FIG. 1 illustrates an overview of an interactive educational apparatus in accordance with the teachings of this invention.
Figure 2:
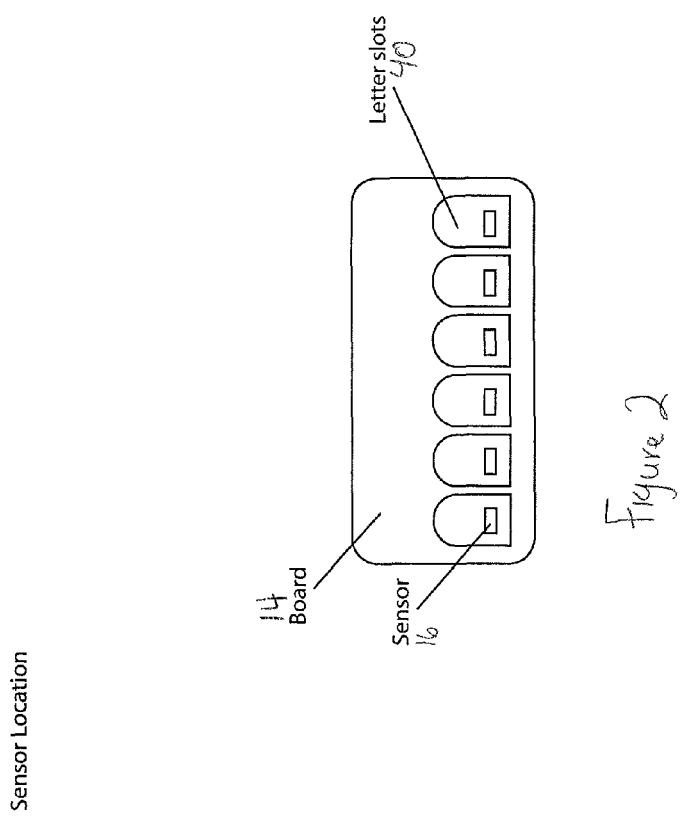
FIG. 2 illustrates an interface board used in the an interactive educational apparatus of FIG. 1 in accordance with the teachings of this invention.

Referring to FIG. 1, there is shown an overview of an interactive language apparatus 10 in accordance with the teachings of this invention. The language apparatus 10 is a language based interactive entertainment platform, ideally suitable for children. A set of symbol pieces 12, preferably in the form of letter blocks are provided. Although the letters are illustrated to be English language letters, the letters can be from any language. An interface board 14 is provided for accommodating one or more selected symbol pieces. As seen in FIG. 2, there is also a sensor 16 on the interface board 14 that generates a signal identifying each symbol piece 12 when placed on said interface board 14. Media files are stored on a storage medium 20 (illustrated in the example to be an external server) and each media file has an associated tag. A processor 22 (seen to be part of the computer 30) is programmed to match a search key represented by one or more selected symbol pieces with said tags as described in detail below. A display device 24 (illustrated to be part of the computer 30) displays one or more media files having identifier tags matching said search key represented by said selected symbol pieces. The identifier tags may include one or more letters. These identifier tags provide a means to match up the media files with each search key as described in detail below.

It should be noted that sensor 16 can be any suitable sensor capable of identifying the symbol piece 12 placed on the board 14. In one embodiment, the sensor 16 may comprise a resistor coupled to a spring loaded connector or an array of pins or switches.

Figure 3:
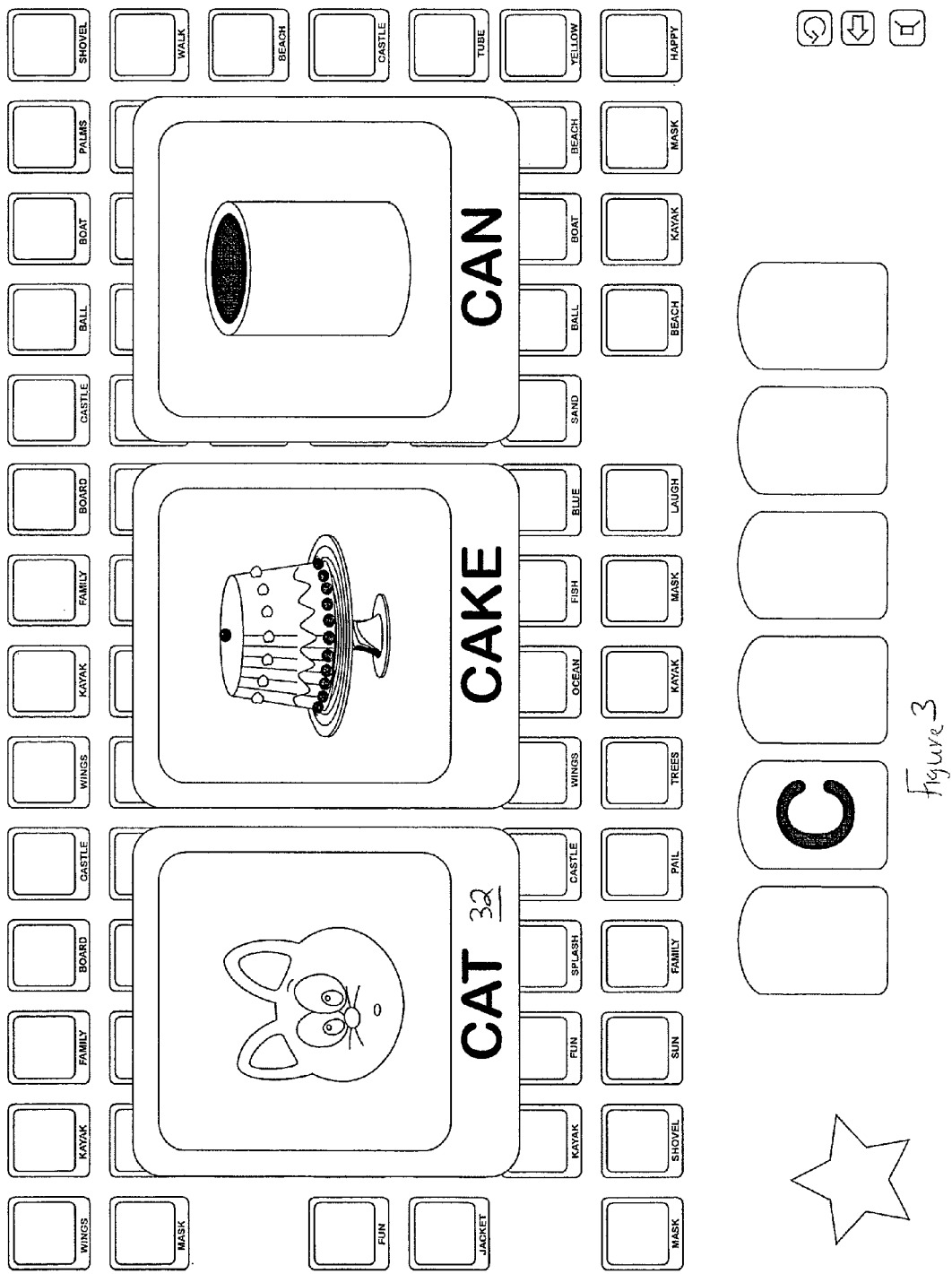
FIG. 3 provides an illustration of one preferred implementation of the interactive educational apparatus of FIG. 1.

The media files could include digital photos, digital videos, animations, sound effects and/or music. In the example shown in FIG. 3, one of the media files is a picture of a cat 32. The user can choose any media files desired, associate identifier tags to each media file and store them on the storage medium. In this way, when a media file matches a key search and is displayed to the child using the apparatus, the media file is familiar. Use of a familiar image, etc. may promote interest and improve the teaching potential of the apparatus. In another embodiment, the media files could be pre-made, original or licensed content.

In the example illustrated, the storage medium is on an external server and the media files are launched from the storage medium to the display device via the Internet using a client application. In this case, various forms of media files with identifier tags are stored on the server. The Internet connection may be any suitable connection such as a high speed connection 50. In addition, the display device 24 is part of a personal computer 30 including interface software to allow the client software to communicate with the interface board. In an alternative embodiment, the storage medium 16 and the display device 24 could both be part of a personal computer 30. The interactive board 14 is in communication with the display and processor via any suitable means, such as a physical cable 52 or wireless connection 54.

Each symbol piece 12 has a unique electronic signature used by the sensor 16 for identifying each symbol piece when placed on said interface board 14. The signature is produced by including on each piece 12 a circuit composed of electrically conductive material which produces a unique electronic signature when coupled with the interface board 14.

In the illustrated embodiment, the interface board 14 includes receptacles 40 for accommodating each symbol piece 12 and each receptacle 40 includes a sensor 16 for reading the resistance signature of a symbol piece 12 when placed in the receptacle 40. In this way, the particular symbol or letter represented by each piece is identified to form the search key. This search key is then used to identify media files with matching tags. In the example shown in FIG. 3, the placed symbol pieces spell out the word "CAT". In one embodiment, a sound effect is triggered when each symbol piece is placed on or removed from said interface board.

The search key is generated by the placement and sequence of symbol pieces 12 in the interface device 14. A match between the search key and identifier tags can occur in full or in part. The leftmost receptacle accommodating a symbol piece is considered to be the first symbol in the search key. Any empty receptacle to the right of the leftmost receptacle is considered to be a wildcard in the search key.

EXAMPLE 1

1) _A_____
2) A_____
3) _____A___

All of the above would return matching tags beginning with the letter "A", such as Apple, Ask, Aunt and Apron).

EXAMPLE 2

1) GA_____
2) _____GA
3) ___GA____

All of the above would return matching tags beginning with the letter sequence "GA", such as Gap, Garon and Game).

EXAMPLE 3

1) _H_M___
2) ____H_M
3) H_M_____

All of the above would return matching tags beginning with the letter sequences "H_M", such as Home, Hammer and Ham.

As symbol pieces are added or removed from the interface board, the search key is regenerated based on the symbol pieces that remain on the interface board.

The generated search key is then used to search and match the identifier tags. When all tags have been searched, matching media files are then displayed on the screen. In one embodiment, prior to display, the available space on the display versus the number of media files to display is calculated. This determines the size and zoom of each media file displayed. The media files with matching tags are zoomed to an appropriate size and scaled to the forefront. All non-matches 42 could become semi-transparent to give the illusion of depth.

In the event that a search key matches a tag identifier in full, then a success event is triggered. In the illustrated example, a success event has been triggered by matching the search key "CAT" to a photograph of a cat 32 which is then predominately displayed. Other success events may include such effects as video, animation, sound effects, music, glow or hallow around the edge of the media file or a game to play.

Figure 4:
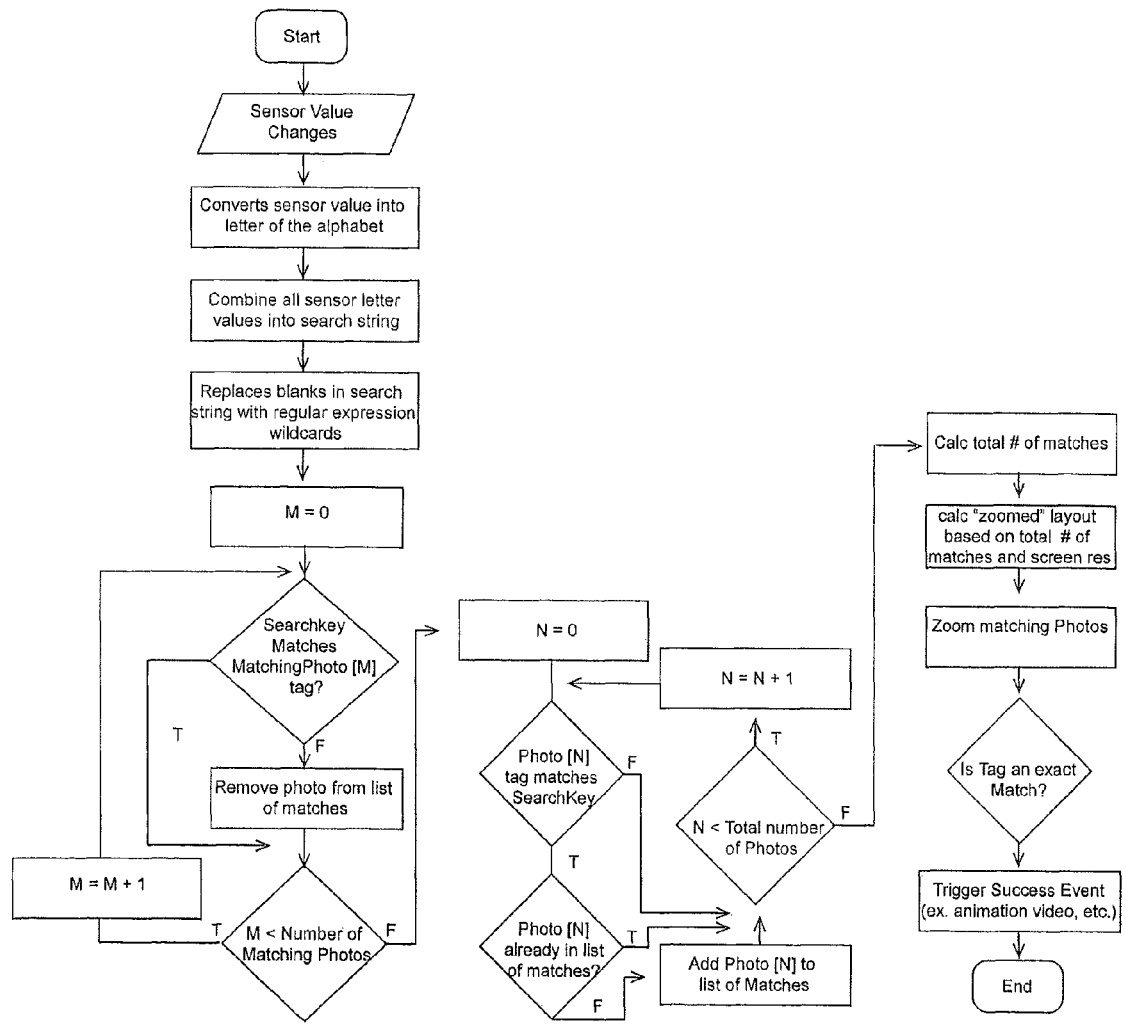
FIG. 4 is a flow chart illustrating a preferred searching mechanism.

FIG. 4 is a flow chart illustrating a preferred searching mechanism. The searching code/mechanism uses regular expressions to match the patterns represented on the board with the list of tags. The search mechanism enables dynamic searching and displaying of multimedia content using metadata in the form of tags. In its primary mode of operation, it is an interactive educational apparatus which enables children to search through and browse multimedia content. It enables this interaction using symbol pieces.

As mentioned above, the media files could be provided by the user. As such they could likely be familiar to the child using the apparatus. In this example, the photograph of the cat may be a family pet perhaps. In this case, the media file, the photograph of the cat 32, may have had the word "cat" as an identifier tag. Using a familiar form of media, such as the photograph of this cat may promote the child's interest and improve the child's ability to learn the spelling of the word "cat". Also, the media files could include other pre-made, original or licensed content.

The display may also include a virtual rendering to the interface board mirroring the state of the physical electronic board. In other words, when a symbol piece is placed on the interface board, a graphical representation of the represented symbol is depicted on the display. The representation mirrors the exact placement of symbol pieces on the interface board, including order and spacing.

Numerous modifications may be made without departing from the spirit and scope of the invention as defined in the appended claims.

What is claimed is:

1. An interactive language apparatus, comprising:
   a set of letter pieces;
   an interface board for accommodating one or more selected letter pieces to create a sequence of letters, the sequence of letters updating each time a letter piece is added and/or removed from the interface board;
   a sensor on said interface board for generating identifying signals identifying each letter piece when placed on said interface board;
   a dynamic search key generated by the identifying signals, the dynamic search key being regenerated each time the sequence of letters changes as letter pieces are added and/or removed from the interface board;
   a storage medium containing media files having associated word tags;
   a processor having a searching mechanism programmed to perform a match of the dynamic search key with said associated word tags to identify at least partially matching media files, the searching mechanism performing a match each time the dynamic search key is regenerated, wherein a match is established when the sequence of letters at least partially matches letters of an associated word tag;
   a list of matches in the processor for storing the at least partially matching media files each time a match is performed by the searching mechanism; and
   a display device for displaying the at least partially matching media files in the list of matches;
   wherein the displayed media files changes dynamically as letter pieces are added and/or removed from the interface board until the sequence of letters spells a word that completely matches one associated word tag to result in one matching media file on the display device.

2. The interactive language apparatus of claim 1, wherein the media files are provided by a user.

3. The interactive language apparatus of claim 1, wherein the letters are English language letters.

4. The interactive language apparatus of claim 1, wherein each letter piece has a unique electronic signature used by the sensor for identifying each letter piece when placed on said interface board.

5. The interactive language apparatus of claim 1, wherein the display device is part of a personal computer.

6. The interactive language apparatus of claim 1, wherein the storage medium is on an external server and the media files are launched from the storage medium to the display device via an Internet connection.

7. The interactive language apparatus of claim 6, wherein the display device is part of a personal computer.

8. The interactive language apparatus of claim 7, wherein the personal computer includes interface software thereon to allow the interface device to communicate with the external server.

9. The interactive language apparatus of claim 1, wherein the interface board includes receptacles for accommodating each letter piece and each receptacle includes a sensor.

10. The interactive language apparatus of claim 9, wherein the leftmost receptacle accommodating a letter piece is considered to be the first letter in the search key.

11. The interactive language apparatus of claim 10, wherein any empty receptacle to the right of the leftmost occupied receptacle is considered to be a wildcard in the search key.

12. The interactive language apparatus of claim 1, wherein the media files include digital photos, digital videos, animations, sound effects and/or music.

13. The interactive language apparatus of claim 1, wherein a sound effect is triggered when each letter piece is placed on or removed from said interface board.

14. The interactive language apparatus of claim 1, wherein the display includes a virtual rendering to the interface board.

15. The interactive language apparatus of claim 1, wherein said media files having identifier tags matching said search key are zoomed and scaled to an appropriate size for display on said display screen.

16. The interactive language apparatus of claim 1, wherein a success event is triggered when a search key matches an identifier tag in full.

17. The interactive language apparatus of claim 1, wherein the display device is part of a personal computer.

18. An interface board for use in an interactive language apparatus, said interface board being configured for accommodating one or more selected letter pieces, the board comprising:
   multiple receptacles on the interface board for accommodating one or more selected letter pieces to create a sequence of letters, the sequence of letters updating each time a letter piece is added and/or removed from the interface board;
   a sensor on said interface board for generating identifying signals identifying each letter piece when placed on said interface board;
   connection to a dynamic search key generated by the identifying signals, the dynamic search key being regenerated each time the sequence of letters changes as letter piece are added and/or removed from the interface board;
   connection to a storage medium containing media files having associated word tags;
   connection to a processor having a searching mechanism programmed to perform a match of the dynamic search key with said associated word tags to identify at least partially matching media files, the searching mechanism performing a match each time the dynamic search key is regenerated, wherein a match is established when the sequence of letters at least partially matches letters of an associated word tag;

connection to a display device, the display device for displaying a list of matches of the at least partially matching media files each time a match is performed by the searching mechanism, wherein the displayed media files changes dynamically as letter pieces are added and/or removed from the interface board until the sequence of letters spells a word that completely matches one associated word tag to result in one matching media file on the display device.

19. A method of using an interactive language apparatus, the method comprising:
- a user placing at least one letter piece from a set of letter pieces on an interface board adapted to accommodate the at least one letter piece to create a sequence of letters;
- a processor in the interactive language apparatus updating the sequence of letters each time a symbol piece is added and/or removed from the interface board;
- using a sensor to generate identifying signals identifying each letter piece when placed on said interface board;
- the processor generating a dynamic search key by the generated identifying signals;
- regenerating the dynamic search key each time the sequence of letters changes as letter piece are added and/or removed from the interface board;
- storing media files having associated word tags in a storage medium;
- using a searching mechanism programmed to perform a match of the dynamic search key with said associated word tags to identify at least partially matching media files;
- the searching mechanism performing a match each time the dynamic search key is regenerated, wherein a match is established when the sequence of letters at least partially matches letters of an associated word tag;
- storing in a list of matches located in the processor the at least partially matching media files each time a match is performed by the searching mechanism;
- displaying on a display device the at least partially matching media files in the list of matches; and
- dynamically changing the at least partially matching media files displayed on the display device as letter pieces are added and/or removed from the interface board until the sequence of letters spells a word that completely matches one associated word tag to result in one matching media file on the display device.

\* \* \* \* \*